R. Gates,
Saw Handle.
No. 98,863.  Patented Jan. 18, 1870.
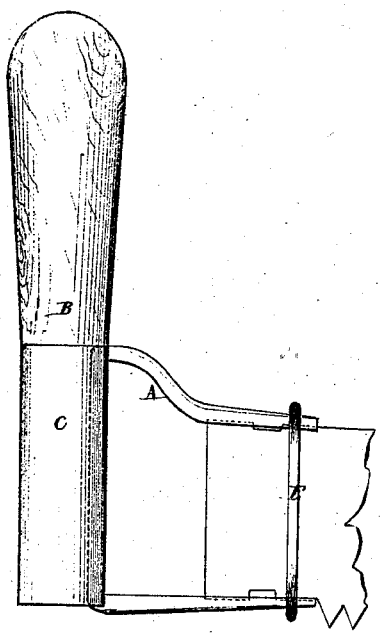
Witnesses.
Geo. W. Sibbitt
J. Holmes.
Inventor
Reuben Gates
per Geo. W. Sibbitt, atty

UNITED STATES PATENT OFFICE.

REUBEN GATES, OF PARMA, OHIO.

IMPROVEMENT IN SAW-HANDLES.

Specification forming part of Letters Patent No. 98,863, dated January 18, 1870.

*To all whom it may concern:*

Be it known that I, REUBEN GATES, of Parma, in the county of Cuyahoga and State of Ohio, have invented certain Improvements in the Method of Attaching Handles to Crosscut-Saws, of which the following is a specification:

This invention relates to an improved method of attaching handles to crosscut-saws.

The old plan of employing screws or bolts is attended with many disadvantages, and soon becomes worn and useless, and requires to be replaced when the saw is still good. Many times, too, a saw will get fast in a log by it closing upon it, when it may become necessary to remove the handle in order to release the saw. In this invention these disadvantages are entirely overcome, making it very convenient and preferable to the old method, as will be seen by the following description.

The drawing is a side view of the handle, showing the manner of securing it to a saw.

A is a frame, which may be cast in malleable iron, and is secured to the handle B by the ferrule c, there being a slot cut in the handle to receive the iron. The inside surface of the ends of the frame A is provided with a groove, in which the edges of the saw-plate rest.

There is a small projection or lug, d, on the frame A, which fits into a notch cut in the saw-plate. This is to prevent the saw slipping in the frame. An oblong ring, E, clasps the frame A, and securely binds it upon the saw. The outside surfaces of the frame are made slightly tapering, so that the ring may be wedged tight by forcing it onto the frame, thus holding the frame very firmly upon the saw.

When it is desired to remove the handle it is very easily done by slipping the ring off the frame, when the handle may be taken off.

This handle is not liable to wear, and will outlast more than one saw. It is so arranged as not to interfere with the saw working down close to the ground, the lower line of the handle being above the line of the saw-teeth.

What I claim, and desire to secure by Letters Patent, is—

The frame A, ring E, and handle B, when constructed, arranged, and combined with a saw in the manner shown, and for the purpose set forth.

REUBEN GATES.

Witnesses:
   GEO. W. TIBBITTS,
   GEO. HESTER.